United States Patent
Yamamoto et al.

(10) Patent No.: US 6,185,061 B1
(45) Date of Patent: *Feb. 6, 2001

(54) SEMICONDUCTOR INTEGRATED CIRCUIT DEVICE FOR USE IN A MAGNETIC DISK DRIVE WITH REDUCED RECOVERY TIME BETWEEN OPERATIONS

(75) Inventors: Minehisa Yamamoto; Takuya Ishida, both of Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/931,413

(22) Filed: Sep. 16, 1997

(30) Foreign Application Priority Data

Sep. 19, 1996 (JP) .................................................. 8-247844

(51) Int. Cl.[7] .......................................................... G11B 5/03
(52) U.S. Cl. .................................................................. 360/66
(58) Field of Search ............................................ 360/66, 69

(56) References Cited

U.S. PATENT DOCUMENTS

| | | |
|---|---|---|
| 4,636,743 | 1/1987 | Cotreau . |
| 5,168,461 | 12/1992 | Wu et al. . |
| 5,600,599 | 2/1997 | Nakayama et al. . |

Primary Examiner—W. Chris Kim
(74) Attorney, Agent, or Firm—Arent Fox Kintner Plotkin & Kahn, PLLC

(57) ABSTRACT

A semiconductor integrated circuit device has a data reproduction circuit for reproducing data read by a head from a magnetic disk during a read operation, a data output circuit for outputting reproduced data obtained as an output of the data reproduction circuit to an external circuit, and an erase current control circuit for controlling an erase current supplied to the head during an erase operation. During an erase operation, the data reproduction circuit is kept deactivated. During transition from an erase operation to a read operation, the data reproduction circuit is activated after the erase current is turned off, and thereafter the data output circuit is activated.

2 Claims, 2 Drawing Sheets

SEMICONDUCTOR INTEGRATED CIRCUIT DEVICE FOR USE IN A MAGNETIC DISK DRIVE WITH REDUCED RECOVERY TIME BETWEEN OPERATIONS

BACKGROUND OF THE INVENTION

1. Field of the Invention

The present invention relates to a semiconductor integrated circuit device used in a magnetic disk drive such as a floppy disk drive to control the current supplied to a head to read data from, write data to, and erase data from a magnetic disk serving as a data storage medium, and to reproduce the data read by the head from the magnetic disk.

2. Description of the Prior Art

Such a semiconductor integrated circuit device includes a data reproduction circuit for reproducing the data received from a head, a data output circuit for processing the data output from the data reproduction circuit to make it ready for output, and a circuit for supplying a write/erase current to the head. Conventionally, in such a semiconductor integrated circuit device, during the transition between an operation for erasing data from a magnetic disk to an operation for reading data therefrom, the erase current is first gradually decreased while keeping the data reproduction circuit active, and then, after the lapse of a predetermined length of time, the erase current is reduced to zero. The purpose of keeping the data reproduction circuit active meanwhile is to make the operation of the semiconductor integrated circuit device as a whole stable enough to allow the data reproduction circuit to be deactivated in a power-save mode.

However, since the erase current is reduced to zero while the data reproduction circuit is kept active, the asymmetry of the reproduced data, i.e. the output of the data reproduction circuit, is degraded by the back electromotive force appearing in an erase head, and it takes as long as hundreds of microseconds for the reproduced data to recover its normal characteristics. This means that it takes extra time to achieve recovery from the erase operation to the read operation (i.e. for the reproduced data to recover its normal characteristics and thus become ready for output after the completion of the erase operation). This inconvenience cannot be alleviated without imposing more limitations on the design of the wiring patterns of the circuit board and on the back electromotive force characteristics of the erase head.

Moreover, since the erase current is reduced to zero at the same time that the data output circuit is turned on, the output of the reproduced data can be restarted quickly after the completion of the erase operation, but this causes the data output circuit to output the reproduced data with degraded characteristics.

SUMMARY OF THE INVENTION

A first object of the present invention is to provide a semiconductor integrated circuit device for a magnetic disk drive which imposes less restrictions on the back electromotive force characteristics of an erase head or other, and which requires less time to recover from an erase operation to a read operation.

A second object of the present invention is to provide a semiconductor integrated circuit device for a magnetic disk drive which can output reproduced data with normal characteristics even just after transition from an erase operation to a read operation.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an embodiment of the present invention will be described with reference to the drawings.

Figure 1:
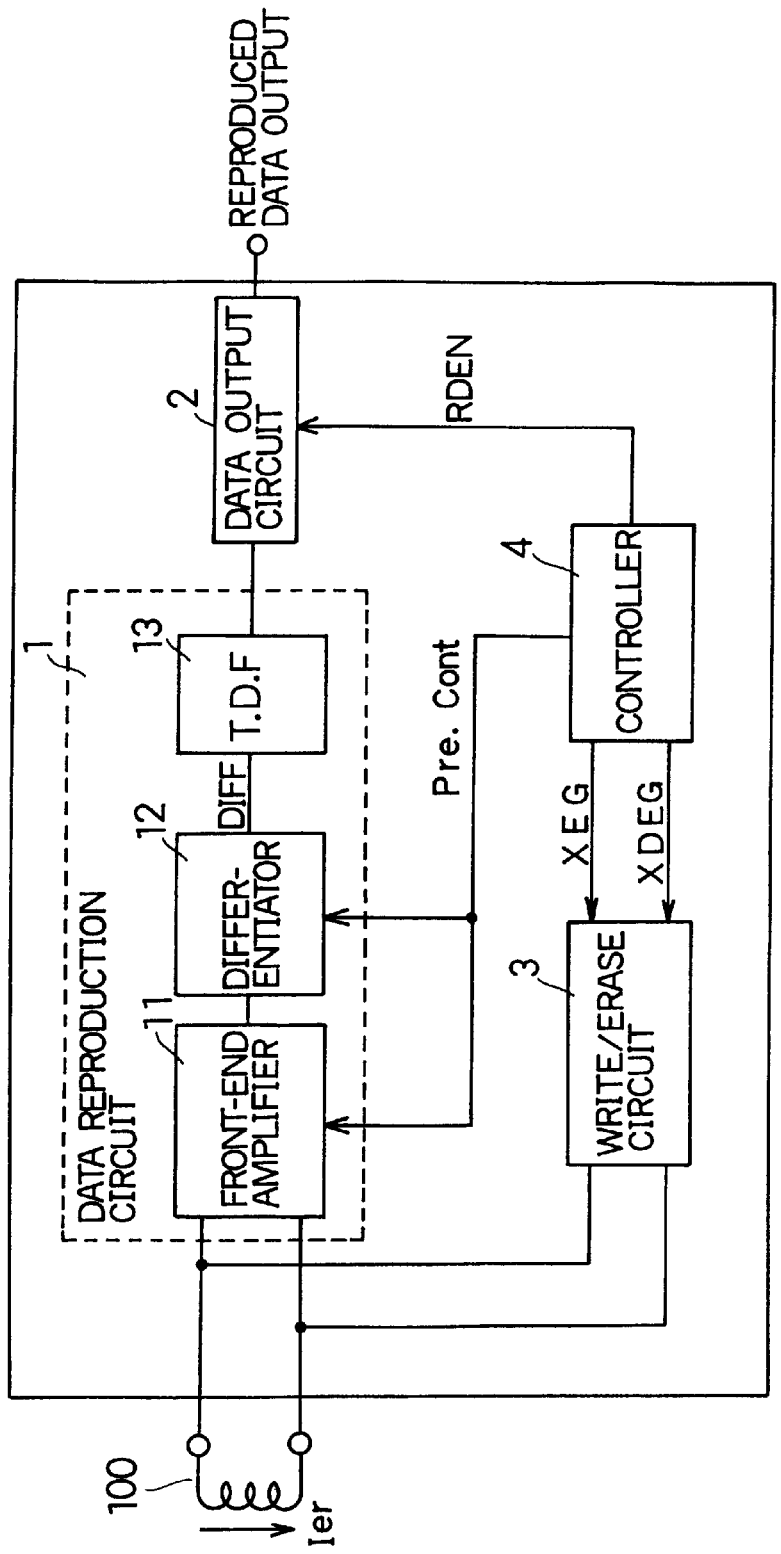
FIG. 1 is a block diagram of a semiconductor integrated circuit device for a magnetic disk drive embodying the present invention.

FIG. 1 is a block diagram of a semiconductor integrated circuit device for use in a magnetic disk drive embodying the present invention. In FIG. 1, numeral 100 represents a head assembly composed of a read/write head that magnetically reads data from and writes data to a magnetic disk (not shown) serving as a data storage medium, and an erase head that magnetically erases data from the magnetic disk. Numeral 1 represents a data reproduction circuit that performs predetermined processing on the data read by the head assembly 100 from the magnetic disk (such data will hereafter be referred to as "read data") in order to reproduce the data. The data reproduction circuit 1 is composed of, from the input side, a front-end amplifier 11 for improving the output characteristics of the read data, a differentiator 12, and a TDF (time domain filter) 13 for forming the output of the differentiator 12 into a waveform of reproduced data.

Numeral 2 represents a data output circuit for outputting the data output from the data reproduction circuit 1 (such data will hereafter be referred to as "reproduced data") to an external circuit. Numeral 3 represents a write/erase circuit for controlling the current supplied to the read/write head of the head assembly 100 when data is written to the magnetic disk and for controlling the current supplied to the erase head when data is erased from the magnetic disk.

Numeral 4 represents a controller for controlling the operation of the above-mentioned circuits by providing a control signal Pre.Cont to the front-end amplifier 11 and to the differentiator 12, a control signal RDEN to the data output circuit 2, and two control signals XEG and XDEG to the write/erase circuit 3.

In the data reproduction circuit 1, the front-end amplifier 11 and the differentiator 12 start operating when the control signal Pre.Cont becomes on, and stop operating when it becomes off. The data output circuit 2 starts operating when the control signal RDEN becomes on, and stops operating when it becomes off. The write/erase circuit 3 starts decreasing the erase current $I_{er}$ (the current supplied to the erase head) when the control signal XEG becomes off, and reduces the erase current $I_{er}$ to zero when the control signal XDEG becomes off.

Figure 2:
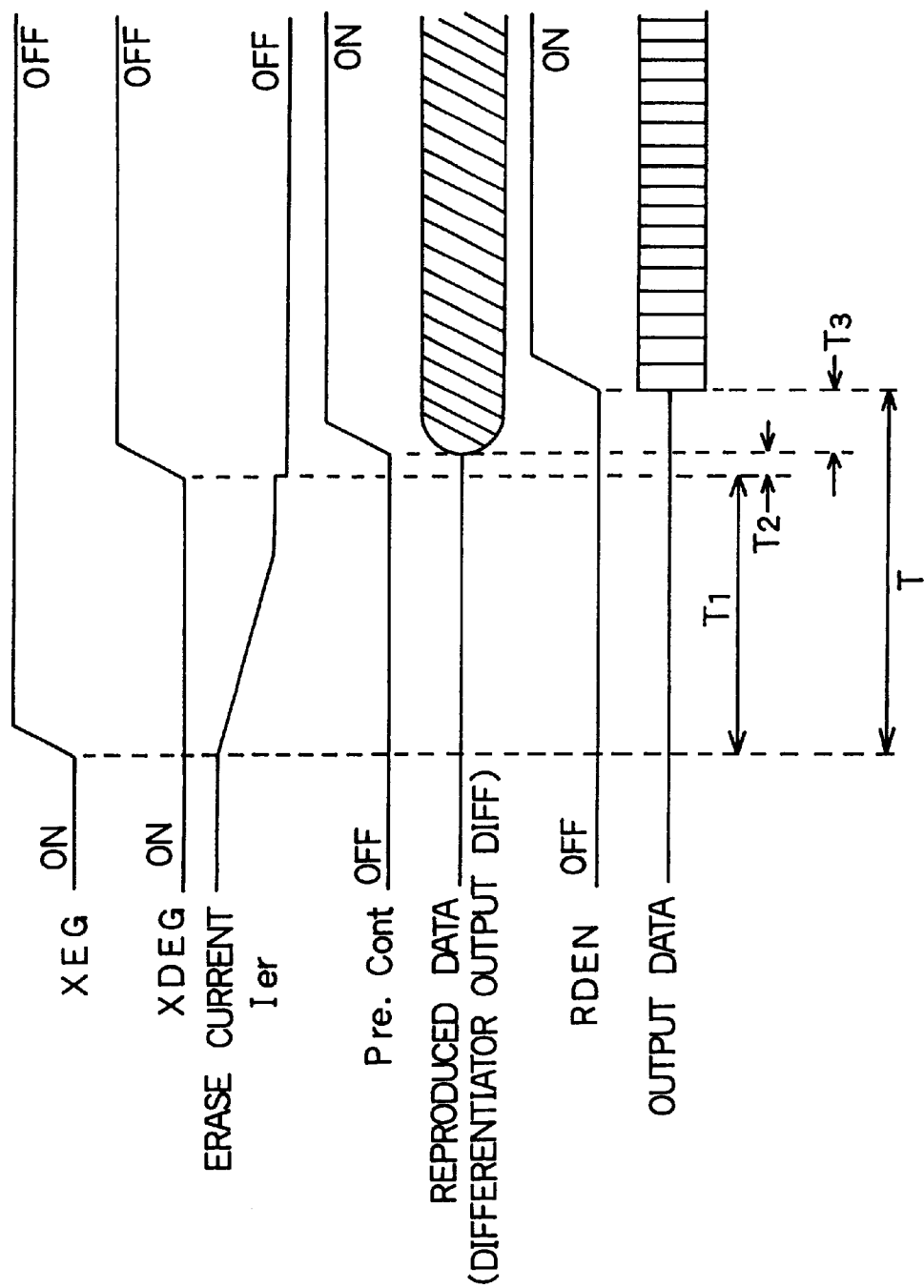
FIG. 2 is a diagram showing the timing with which the controller controls the control signals during transition from a erase operation to a read operation in the semiconductor integrated circuit device for a magnetic disk drive shown in FIG. 1.

As shown in FIG. 2, during transition from an erase operation to a read operation, the controller 4 first turns off the control signal XEG, and then, after the lapse of a predetermined length of time $T_1$, it turns off the control signal XDEG. Next, after the lapse of a predetermined length of time $T_2$ after the turning off of the control signal XDEG, the controller 4 turns on the control signal Pre.Cont, which has been kept off during the erase operation. Subsequently, after the lapse of a predetermined length of time $T_3$, the controller 4 turns on the control signal RDEN.

As a result of the above-described timing control, the data reproduction circuit 1, which is kept deactivated during the erase operation, is activated only after the lapse of the predetermined time $T_2$ after the erase current $I_{er}$ is turned off. Accordingly, by adequately setting the length of the time $T_2$, it is possible to prevent the reproduced data output from the data reproduction circuit 1 from being affected by the back electromotive force occurring in the erase head, and thus it is possible to prevent the degradation of the characteristics (asymmetry) of the reproduced data.

In addition, the data output circuit 2 is activated only after the lapse of the predetermined time $T_3$ after the activation of the data reproduction circuit 1. Accordingly, by adequately setting the length of time $T_3$, it is possible to make the data output circuit 2 start outputting the reproduced data after the activation of the data reproduction circuit 1 from its deactivated state has been completed, that is, after the characteristics of the reproduced data have been sufficiently stabilized, and thus it is possible to output the reproduced data with normal characteristics from the beginning.

Specifically, in the embodiment, the length of time $T_1$ is set to 24 μs, the length of time $T_2$ is set to 2 μs, and the length of time $T_3$ is set to 6 μs. Accordingly, the total time T required for recovery from an erase operation to a read operation is 32 μs, that is, the sum of the above-mentioned lengths of time.

As a result, in the semiconductor integrated circuit device of the embodiment, the sum of the time that is secured after the turning off of the erase current $I_{er}$ before the activation of the data reproduction circuit 1 to prevent the reproduced data from being affected by the back electromotive force occurring in the erase head and thereby to prevent the degradation of the characteristics of the reproduced data and the time that is required by the data reproduction circuit 1 to return from a deactivated state to an active state is far shorter than the time required in the conventional semiconductor integrated circuit device for the reproduced data to recover its normal characteristics after being degraded by the back electromotive force occurring in the erase head. That is, the embodiment requires less time to recover from an erase operation to a read operation than the conventional circuit.

This leads also to alleviation of restrictions on the design of the patterns of the circuit board and on the back electromotive force characteristics of the erase head. Moreover, the data reproduction circuit 1 is kept deactivated during an erase operation in the embodiment whereas it is kept active in the conventional circuit, and this leads to reduction of current consumption.

What is claimed is:

1. A semiconductor integrated circuit device that is used in a magnetic disk drive to write data to, read data from, and erase data from a magnetic disk used as a data storage medium by means of a head, comprising:

data reproduction means for reproducing data from a signal read by the head from the magnetic disk;

data output means for outputting reproduced data obtained as an output of the data reproduction means to an external circuit;

write/erase means for controlling a current supplied to the head when data is written to or erased from the magnetic disk; and control means for controlling operation of the data reproduction means, the data output means, and the write/erase means, wherein, during an erase operation, the control means outputs a control signal which keeps the data reproduction means deactivated, and, during transition from an erase operation to a read operation, the control means first turns off an erase current, and then, a first predetermined length of time thereafter, outputs a control signal which activates the data reproduction means, and then, a second predetermined length of time thereafter, outputs a control signal which activates the data output means.

2. A semiconductor integrated circuit device as claimed in claim 1, wherein the first predetermined length of time equals to a length of time required for a back electromotive force occurring in the magnetic head to subside sufficiently not to affect the reproduced data, and the second predetermined length of time equals to a length of time required for the reproduced data to substantially recover its normal characteristics.

* * * * *